United States Patent
Lu et al.

(10) Patent No.: US 9,596,620 B2
(45) Date of Patent: Mar. 14, 2017

(54) CONGESTION PROCESSING METHOD, APPARATUS, AND CORE NETWORK

(71) Applicant: Huawei Technologies Co., Ltd., Shenzhen (CN)

(72) Inventors: Wei Lu, Shenzhen (CN); Yijun Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 14/615,346

(22) Filed: Feb. 5, 2015

(65) Prior Publication Data
US 2015/0156661 A1 Jun. 4, 2015

Related U.S. Application Data

(63) Continuation of application No. PCT/CN2012/080471, filed on Aug. 22, 2012.

(51) Int. Cl.
*H04L 12/26* (2006.01)
*H04W 28/02* (2009.01)
(Continued)

(52) U.S. Cl.
CPC ... *H04W 28/0226* (2013.01); *H04W 28/0252* (2013.01); *H04W 36/0055* (2013.01); *H04W 36/16* (2013.01); *H04W 36/22* (2013.01)

(58) Field of Classification Search
CPC ............ H04W 28/0226; H04W 36/16; H04W 28/0252; H04W 36/22
(Continued)

(56) References Cited

U.S. PATENT DOCUMENTS

| 8,761,007 | B1* | 6/2014 | Damle | H04L 45/18 370/229 |
| 2011/0176414 | A1* | 7/2011 | De Franca Lima | H04L 47/12 370/230 |
| 2011/0188457 | A1* | 8/2011 | Shu | H04W 28/24 370/329 |

FOREIGN PATENT DOCUMENTS

| CN | 1780465 A | 5/2006 |
| CN | 1859754 A | 11/2006 |

(Continued)

OTHER PUBLICATIONS

1st Office Action and Search Report in cognate Chinese Patent Application No. 201280001692 (Sep. 5, 2016).

*Primary Examiner* — Sai-Ming Chan
(74) *Attorney, Agent, or Firm* — Leydig, Voit & Mayer, Ltd.

(57) ABSTRACT

The present invention provides a congestion processing method, apparatus, and system. The method comprises: in a process of a UE performing handover from a source cell, in a congestion status, of a source access network element to a target cell, in a normal status, of a target access network element, receiving second indication information sent by a second access network element, wherein the second indication information is used for indicating a status of a second cell; sending notification information to a network side according to the indication message, wherein the notification information is used for notifying the network side to restore a status of the UE from a congestion and controlled status to a normal status. In the present invention, determining how to notify the network side and notifying the network side timely to restore the status of the UE to the normal status are realized.

19 Claims, 4 Drawing Sheets

--- in a process of a user equipment UE performing handover from a source cell, in a congestion status, of a source access network element to a target cell, in a normal status, of a target access network element, a first access network element receives second indication information sent by a second access network element, wherein the second indication information is used for indicating a status of a second cell — S101 the first access network element sends notification information to a network side according to the indication message, wherein the notification information is used for notifying the network side to restore a status of the UE from a congestion and controlled status to a normal status — S102

(51) Int. Cl.
 *H04W 36/22* (2009.01)
 *H04W 36/16* (2009.01)
 *H04W 36/00* (2009.01)
(58) Field of Classification Search
 USPC .......................................................... 370/236
 See application file for complete search history.

(56) References Cited

FOREIGN PATENT DOCUMENTS

| | | | |
|---|---|---|---|
| CN | 101534355 | A | 9/2009 |
| CN | 101711041 | A | 5/2010 |
| CN | 102333346 | A | 1/2012 |
| EP | 2512176 | A1 | 10/2012 |

* cited by examiner

CONGESTION PROCESSING METHOD, APPARATUS, AND CORE NETWORK

CROSS-REFERENCE TO RELATED APPLICATIONS

This application is a continuation of International Patent Application No. PCT/CN2012/080471, filed on Aug. 22, 2012, which is hereby incorporated by reference in its entirety.

TECHNICAL FIELD

The present invention belongs to a field of radio technology, and particularly relates to a congestion processing method, apparatus and core network.

BACKGROUND

Due to a limitation of a capacity of a cell deployed in a radio network, a congestion may be caused by an excessive access of user equipments (User Equipment, UE), and this scenario is called an access network congestion in a communication system architecture.

In order to alleviate the access network congestion, a network side may take a measure by modifying a quality of service (Quality of Service, QoS) parameter of a bearer of a UE (for example, reducing a maximum bit rate (Maximum Bit Rate, MBR) and a guaranteed bit rate (Guaranteed Bit Rate, GBR) of the bearer), activating a part of bearers, separating a part of users or the like. For illustrative purpose, in the present invention, a UE in this status is called a UE in a congestion and controlled status. When a cell where the UE is located is in a non-congestion status, the network side should remove the measure used to alleviate the congestion so as to restore a normal status of the UE. Therefore, the network side should perceive a congestion status of a cell on an access network side in time. The congestion status may refer to a congestion degree (e.g., high, medium, low, or the like), the non-congestion status or the like. All of congestion statuses in embodiments of the specification refer to this meaning, and in a case of a congestion in an access network side, the access network side should report the congestion status thereof to the network side.

At present, there are two kinds of technical solutions for an access network to report a congestion status, one is to report the congestion status through a control signaling, i.e., in the case of a congestion of an access network side, an access network equipment (an eNodeB or a radio network controller (Radio Network Controller, RNC)) may send a congestion status notification message to a mobility management network element (Mobility Management Entity, MME) or a serving GPRS support node (Serving GPRS Support Node, SGSN), and the mobility management network element notifies a policy and charging control device, for example, a policy and charging rules function (Policy and Charging Rules Function, PCRF) that a bearer modification, a bearer deactivation, or the like may be initiated through a communication network node such as a serving gateway (Serving Gateway, SGW)/packet data network gateway (Packet Data Network Gateway, PGW), a gateway GPRS support node (Gateway GPRS Support Node, GGSN)) or the like. The defect of this solution lie in that the process needs to be added as there is no similar processing process in an existing protocol possibly leading a large influence on the existing protocol.

The other solution is to report the congestion status through a user plane, i.e., when a congestion occurs, a congestion status indication is included in a header of an uplink user plane packet. Then a gateway equipment PGW/a gateway GPRS support node perceives the congestion of the access network, and may notify a policy and charging control equipment to implement a process such as modifying a quality of service of a bearer, deactivating a bearer or the like.

Since a large number of data packets are transmitted in each gateway equipment, if a header of a uplink data packet of a user plane is used to notify the network side of the congestion status of the access network cell, and if each data packet includes information indicating the congestion of the access network cell in a time period before the removal of the congestion, the amount of the data packets used for notifying the congestion status of the access network cell may be huge due to an overlong duration of the congestion, which is inconsistent with currently promoted concepts of energy saving, emission reduction and environmental protection.

Therefore, when congestion occurs, uplink user plane data packets only within a period of time, for example 2s, may be used for notifying the congestion of the access network cell. That is to say, 2s after the occurrence of the congestion of the cell, there is no notification of the congestion of the current network to the network side any more. In addition, according to a specific condition of the congestion of the cell, the congestion status may be divided into multiple grades, such as mild, moderate, severe and the like. The network side may take different measures according to different congestion statuses. Therefore, when the congestion status changes, the access network needs to notify the network side of the current congestion status in time. After the removal of the congestion, the removal of the congestion of the cell may be notified in an uplink user plane data packet, and the network side may also remove a measure taken for alleviating the congestion according to the congestion status of the cell, thereby restoring a normal status of the user. Then, we consider that only within the short period of time (e.g., 2s) when the congestion occurs and when the congestion status changes, the access network equipment notifies the network side of the congestion status thereof through the uplink user plane data packets.

Then, in the prior art, there exists a problem in the following scenario.

A UE resides in a cell covered by an access network, which is congested. After receiving a congestion status notification of the access network, the network side takes a measure such as modifying a QOS of a bearer of the UE and the like. And after the time for the congestion status notification expires, for example, the 2s in the foregoing example expires, then there is no congestion status indication included in the data packets any more. If an access network handover procedure occurs during a movement of the UE, a target access network element may be not congested. After the handover is completed, the target access network element will not include congestion status indication information in the uplink data packets either. Thus, the network side could not perceive that the current UE has performed handover to a non-congested access network cell in time, and could not recover the status of the user in time. This is unreasonable for the user, and the original service level of the user should be restored in time.

To sum up, in the prior art, when the UE performs handover to a non-congested access network cell, the network side may be unable to timely perceive that the UE is currently located in the non-congested access network cell, and can not remove the measure taken for alleviating the congestion, which reduces user experience.

SUMMARY

Embodiments of the present invention provide a congestion processing method, apparatus and core network, which are used for solving a problem in the prior art that, in a process of a UE performing handover from a source cell, in a congestion status, of a source access network element to a target cell, in a normal status, of a target access network element, a network side could not perceive that the UE is currently located in a non-congested target cell in time, and could not timely remove a measure taken for alleviating the congestion to restore the normal status of a user.

In one aspect, a congestion processing method is provided, including:

in a process of a user equipment UE performing handover from a source cell, in a congestion status, of a source access network element to a target cell, in a normal status, of a target access network element, receiving, by a first access network element, second indication information sent by a second access network element, wherein the second indication information is used for indicating a status of a second cell, sending, by the first access network element, notification information to a network side according to the indication message, wherein the notification information is used for notifying the network side to restore a status of the UE from a congestion and controlled status to a normal status, wherein the first access network element is the source access network element, the second access network element is the target access network element, and the second cell is the target cell; or the first access network element is the target access network element, the second access network element is the source access network element, and the second cell is the source cell.

Furthermore, the first access network element sends first indication information to the second access network element, wherein the first indication information is used for indicating a status of a first cell, wherein when the first access network element is the source access network element and the second access network element is the target access network element, the first cell is the source cell; or when the first access network element is the target access network element and the second access network element is the source access network element, the first cell is the target cell.

Furthermore, the sending, by the first access network element, the notification information to the network side, wherein the notification information is used for notifying the network side to restore the status of the UE from the congestion and controlled status to the normal status comprises:

sending, by the first access network element, the notification information to a packet data network gateway PGW of the network side, wherein the notification information is used for notifying the PGW to restore the status of the UE from the congestion and controlled status to the normal status.

Furthermore, the sending, by the first access network element, the notification information to the packet data network gateway PGW of the network side comprises:

sending, by the first access network element, the notification information to the packet data network gateway PGW of the network side through an uplink user plane data packet.

Furthermore, a header of a GPRS tunneling protocol for the user plane GTP-U of the uplink user plane data packet comprises the notification information.

Furthermore, the uplink user plane data packet is an uplink user plane data packet of the UE; or the uplink user plane data packet is an uplink user plane data packet of other UE, wherein the other UE and the UE all establish a bearer with the same PGW.

Furthermore, the sending, by the first access network element, the notification information to the packet data network gateway PGW of the network side comprises:

sending, by the first access network element, a first control plane message including the notification information to a mobility management network element of the network side;

sending, by the mobility management network element, a second control plane message including the notification information to the PGW.

Furthermore, the restoring the status of the UE from the congestion and controlled status to the normal status comprises:

restoring a quality of service QoS of a bearer of the UE from a QoS corresponding to the congestion and controlled status to a QoS corresponding to the normal status.

Furthermore, the receiving, by a first access network element, the second indication information sent by the second access network element comprises:

receiving, by the first access network element, the second indication information sent by the second access network element through a mobility management network element of the network side.

In another aspect, a congestion processing apparatus is provided, and is applied in a process of a user equipment UE performing handover from a source cell, in a congestion status, of a source access network element to a target cell, in a normal status, of a target access network element, wherein when the apparatus is the source access network element, the target access network element is a second access network element, and the target cell is a second cell, or when the apparatus is the target access network element, the source access network element is a second access network element, and the source cell is a second cell, the apparatus comprising:

a receiving unit, configured to receive second indication information sent by the second access network element, wherein the second indication information is used for indicating a status of the second cell;

a notifying unit, configured to send notification information to a network side according to the indication message, wherein the notification information is used for notifying the network side to restore a status of the UE from a congestion and controlled status to a normal status.

Furthermore, the apparatus further includes:

a first indication sending unit, configured to send first indication information to the second access network element, wherein the first indication information is used for indicating a status of a first cell, wherein when the first access network element is the source access network element and the second access network element is the target access network element, the first cell is the source cell; or when the first access network element is the target access network element and the second access network element is the source access network element, the first cell is the target cell.

Furthermore, the notifying unit comprises:

a notifying module, configured to send the notification information to a packet data network gateway PGW of the network side, wherein the notification information is used for notifying the PGW to restore the status of the UE from the congestion and controlled status to the normal status.

Furthermore, the notifying module sends the notification information to the packet data network gateway PGW of the network side through an uplink user plane data packet.

Furthermore, a header of a GPRS tunneling protocol for the user plane GTP-U of the uplink user plane data packet comprises the notification information.

Furthermore, the uplink user plane data packet is an uplink data plane data packet of the UE; or the uplink user plane data packet is an uplink user plane data packet of other UE, wherein both of the other UE and the UE establish bearers with the same PGW.

Furthermore, the notifying module comprises:

a message sending sub-module, configured to send a first control plane message including the notification information to a mobility management network element of the network side, and then the mobility management network element sends a second control plane message including the notification information to the PGW.

Furthermore, the notifying unit further comprises:

a quality of service restoring module, configured to restore a quality of service QoS of a bearer of the UE from a QoS corresponding to the congestion and controlled status to a QoS corresponding to the normal status.

Furthermore, the receiving unit comprises:

a receiving module, configured to receive the second indication information sent by the second access network element through a mobility management network element of the network side.

In another aspect, a congestion processing system is provided, and is applied in a process of a user equipment UE performing handover from a source cell, in a congestion status, of a source access network element to a target cell, in a normal status, of a target access network element, comprising a first access network element, a second access network element and a network side, the first access network element receiving second indication information sent by the second access network element, wherein the second indication information is used for indicating a status of a second cell, the first access network element sending notification information to the network side according to the indication message, wherein the notification information is used for notifying the network side to restore a status of the UE from a congestion and controlled status to a normal status, wherein the first access network element is the source access network element, the second access network element is the target access network element, and the second cell is the target cell; or the first access network element is the target access network element, the second access network element is the source access network element, and the second cell is the source cell.

In one embodiment of the present invention, that determining how to notify the network side and notifying the network side timely to restore the status of the UE to the normal status are realized, so that better experience can be acquired by a user, a network source can be utilized to a larger extent, and more benefit can be acquired by an operator.

DESCRIPTION OF EMBODIMENTS

In order to make a purpose, technical solution and advantage of the present invention more clear, the present invention will be further described below in detail, in combination with accompanying drawings and embodiments. It should be understood that, a specific embodiment described herein are merely used for illustrating the present invention, rather than limiting the present invention.

In an embodiment of the present invention, in a process of a user equipment UE performing handover from a source cell in a congestion status of a source access network element to a target cell in a normal status of a target access network element, a first access network element receives second indication information sent by a second access network element, and the first access network element sends notification information to a network side according to the second indication information, in order to notify the network side to restore a status of the UE from a congestion and controlled status to a normal status. Based on the current congestion status of the target cell of the target access network element, that determining how to notify the network side and notifying the network side timely to restore the status of the UE to the normal status are realized, so that better experience can be acquired by a user, a network source can be utilized to a larger extent, and more benefit can be acquired by an operator.

The implementation of the present invention will be described below in detail in combination with specific embodiments.

Figure 1:
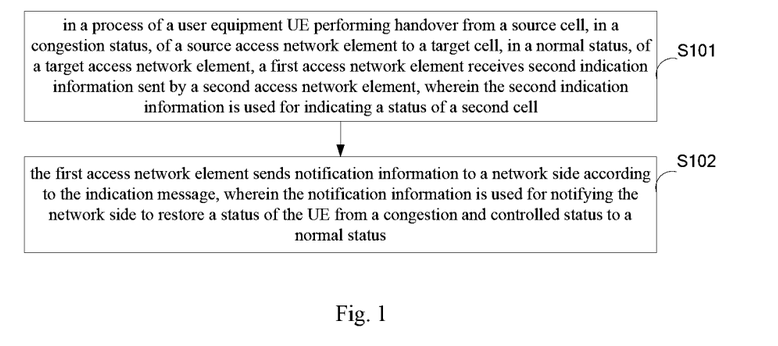
FIG. 1 is an implementation flowchart of a congestion processing method provided by one embodiment of the present invention.

FIG. 1 shows an implementation flow of a congestion processing method provided by one embodiment of the present invention, which is illustrated specifically as follows.

In step S101, in a process of a user equipment UE performing handover from a source cell, in a congestion status, of a source access network element to a target cell, in a normal status, of a target access network element, a first access network element receives second indication information sent by a second access network element, wherein the second indication information is used for indicating a status of a second cell.

In one embodiment, the first access network element is the source access network element, the second access network element is the target access network element, and the second cell is the target cell. Alternatively, the first access network element is the target access network element, the second access network element is the source access network element, and the second cell is the source cell.

In addition, the first access network element may also send first indication information to the second access network element, and the first indication information is used for indicating the status of a first cell, wherein when the first access network element is the source access network element and the second access network element is the target access network element, the first cell is the source cell; or when the first access network element is the target access network element and the second access network element is the source access network element, the first cell is the target cell.

In step S102, the first access network element sends notification information to a network side according to the indication message, wherein the notification information is used for notifying the network side to restore a status of the UE from a congestion and controlled status to a normal status.

In one embodiment, the first access network element sends the notification information to a packet data network gateway PGW of the network side to notify the PGW to recover the status of the UE from the congestion and controlled status to the normal status.

The first access network element may send the notification information in two manners One manner is as follows.

The first access network element sends the notification information to the packet data network gateway PGW of the network side through an uplink user plane data packet, wherein a header of a GPRS tunneling protocol for the user plane (GPRS Tunneling Protocol for the user plane, GTP-U) of the uplink user plane data packet comprises the notification information. Specifically, the uplink user plane data packet is an uplink data plane data packet of the UE. Or the uplink user plane data packet is an uplink user plane data packet of other UE, wherein both of the other UE and the UE establish bearers with the same PGW.

The other manner is as follows.

The first access network element firstly sends a first control plane message including the notification information to a mobility management network element of the network side, and the mobility management entity sends a second control plane message including the notification information to the PGW.

Specifically, in one embodiment, the network side restores a quality of service QoS of a bearer of the UE from a QoS corresponding to the congestion and controlled status to a QoS corresponding to a normal status, so as to alleviate the congestion and controlled status of the UE, wherein a parameter of the QoS includes a maximum bit rate (Maximum Bit Rate, MBR), an aggregate maximum bit rate (Aggregate Maximum Bit Rate, AMBR) or a guaranteed bit rate (Guaranteed Bit Rate, GBR). Values of these parameters are modified to alleviate the congestion and controlled status of the UE.

In one embodiment, it is realized that in the process of the UE performing handover from the source cell, in the congestion status, of the source access network element to the target cell, in the normal status, of the target access network element, the network side can perceive the current status of the UE in time and can timely remove the congestion and controlled status of the UE, so that better experience can be acquired by a user, a network source can be utilized to a larger extent, and more benefit can be acquired by an operator.

Figure 2:
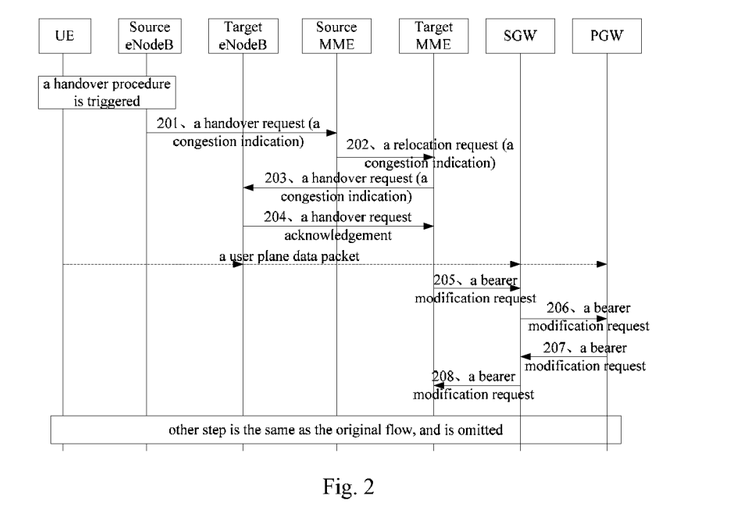
FIG. 2 is an implementation flowchart of a congestion processing method provided by one embodiment of the present invention.

FIG. 2 shows an implementation flow of a congestion processing method provided by one embodiment of the present invention. In this embodiment, in the condition that a user equipment UE performs handover from a source access network element to a target access network element, the UE is in a congestion and controlled status, for example, as an access network of a source side is in a congestion status, the UE is in the congestion and controlled status, such as a QoS parameter of a bearer of the UE is lowered, and a cell of the target access network element is congested, an uplink user plane data packet is sent through the target access network element to notify a network side to restore a status of the UE from the congestion and controlled status to a normal status, which is illustrated specifically as follows.

Step 201, the source access network element sends a handover request to a mobility management network element of a source side, wherein the handover request includes an indication for indicating that a cell congestion status occurs in the source access network element where the UE resides or an indication for indicating that the UE is in the congestion and controlled status. The specific form of the indication is not limited, and it may include, but not limited to, a congestion status or the like.

Step 202, the source mobility management network element sends a relocation request to a target mobility management network element, wherein the relocation request includes the indication for indicating that the cell congestion status occurs in the source access network element or the indication for indicating that the UE is in the congestion and controlled status.

Step 203, the target mobility management network element sends a handover request to the target access network element, wherein the handover request includes the indication for indicating that the cell congestion status occurs in the source access network element or the indication for indicating that the UE is in the congestion and controlled status.

Step 204, the target access network element initiates a handover request acknowledgement to the target mobility management network element.

Step 205, the target mobility management network element sends a bearer modification request to an SGW.

Step 206, the SGW sends a bearer modification request to the PGW.

Step 207, the PGW sends a bearer modification request to the SGW.

Step 208, the SGW sends a bearer modification request to the target mobility management network element.

Wherein, after the target access network element receives the indication for indicating the cell congestion occurs in the source access network element or the indication for indicating that the UE is in the congestion and controlled status, the target access network element perceives that the UE is still in the congestion and controlled status due to the congestion of the source access network element, and there is no congestion in the current access network element. Then after an uplink data channel is established (as shown by a dotted line in the figure), a congestion removing indication or a non-congestion status which the current access network operates in or the like may be reported through a GTP-U header identifier of the user plane data packet to facilitate the decision of the network side. The specific form of the indication is not limited herein. After receiving the congestion removing indication, the network side may initiate an operation of alleviating the congestion and controlled status of the UE after a downlink control plane is successfully established (as shown in step 8 in the figure), such as recovering a QoS parameter of a bearer of the UE, and the like.

Particularly, if the UE has no uplink user plane data packet, according to a gateway device to which a UE bearer is accessed, for example, a PGW, an uplink user plane data packet in a bearer of other user, which establishes a bearer with the same PGW, may be selected to notify the network side to remove the congestion. Then the uplink user plane data packet includes an identifier of the UE which is performing handover and a congestion removing indication.

Optionally, an empty user plane data packet may also be sent by the UE, namely, the user plane data packet only includes a header of a data packet, and the header of the data packet header includes the congestion removing indication, wherein the data packet is merely used for notifying the network side to remove the congestion.

Figure 3:
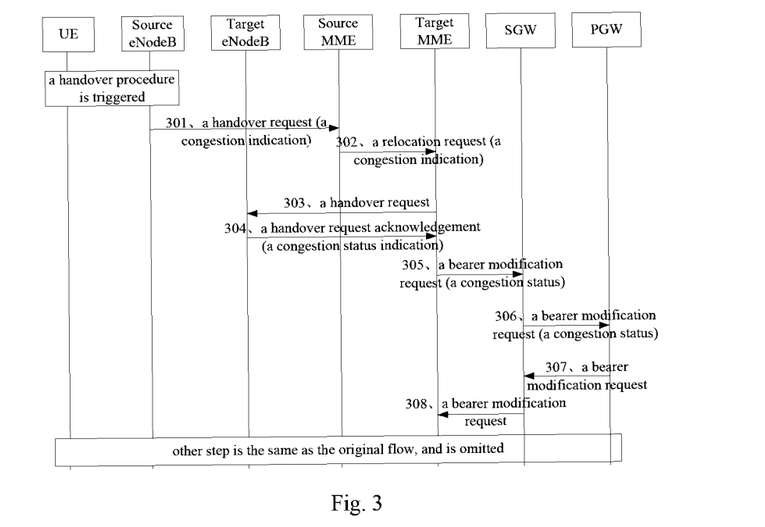
FIG. 3 is an implementation flowchart of a congestion processing method provided by one embodiment of the present invention.

FIG. 3 shows an implementation flow of a congestion processing method provided by one embodiment of the present invention. The difference with the processing in the embodiment described in FIG. 2, in which the congestion and controlled status of the UE is removed through a user plane data packet notification, lies in that, in this embodiment, a target mobility management network element sends a control plane message to notify the network side to remove a congestion measure for the UE in the congestion and controlled status, which is illustrated specifically as follows.

Step 301, a source access network element sends a handover request to a source mobility management network element, wherein the handover request includes an indication for indicating that the source access network element is in a congestion status or the UE is in a congestion and controlled status. The specific form of the indication is not limited, which is the same as a foregoing embodiment, for example, a congestion status (Congestion Status).

Step 302, the source mobility management network element sends a relocation request to the target mobility management network element, wherein the relocation request includes the indication for indicating the source access network element is in the congestion status or the UE is in the congestion and controlled status. The specific form is as shown in the foregoing step.

Step 303, the target mobility management network element sends a handover request to a target access network element.

Step 304, the target access network element sends a handover request acknowledgement to the target mobility management network element, wherein the handover request acknowledgement includes a cell congestion status of the current target access network element to which the UE is accessed, which includes but not limited to information such as congestion, non-congestion, congestion degree and so on. If the handover request includes no indicator of congestion status, it may be considered that the current target access network element to which the UE is accessed is in a non-congestion status.

Step 305, the target mobility management network element sends a bearer modification request message to an SGW, wherein the message includes a received cell congestion status of the current target access network element. If it is not received, it may be considered that the current target access network element is in a non-congestion status, and then an indicator indicating removing the measure for a congestion may be included in the message, the specific form of which is not limited.

Step 306, the SGW sends a bearer modification request to a PGW, wherein the bearer modification request includes the access network congestion status received in step 305.

Step 307, the PGW sends a bearer modification request to the SGW.

Step 308, the SGW sends a bearer modification request to the target mobility management network element.

After receiving the congestion removing indication, the gateway device may initiate an operation of removing measure for a congestion after step 308 is completed.

Figure 4:
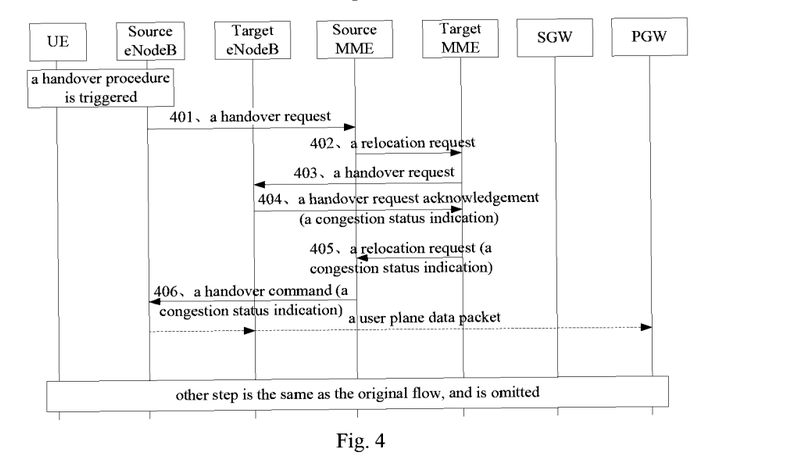
FIG. 4 is an implementation flowchart of a congestion processing method provided by one embodiment of the present invention.

FIG. 4 shows an implementation flow of a congestion processing method provided by one embodiment of the present invention. The difference with the embodiments described in FIG. 2 and FIG. 3 lies in that, in this embodiment, after UE performs handover to a target access network element, if a source access network element finds out that a network element in a target side is in a non-congestion status, the source access network element may also notify a network side to initiate a measure of removing a congestion, which is illustrated specifically as follows.

Step 401, the source access network element sends a handover request to a source mobility management network element.

Optionally, if the source access network element is in a congestion status, or a UE is currently in a congestion and controlled status, the message may include the indication.

Step 402, the source mobility management network element sends a relocation request to a target mobility management network element.

Optionally, if an indication for indicating a access network of the source side is in a congestion status or the UE is in the congestion controlled status is received in step 401, the message in this step may include the indication.

Step 403, the target mobility management network element sends a handover request acknowledgement to a target access network element.

Optionally, if an indication for indicating a access network of the source side is in a congestion status or the UE is in the congestion controlled status is received in step 402, the message in this step may include the indication.

Step 404, the target access network element sends a handover request acknowledgement to the target side mobility management network element, wherein the handover request acknowledgement includes a congestion status indication of the target access network element. The indication information of the congestion status is not limited. It may be an indicating manner like releasing congestion.

Optionally, after the indication for indicating the source side access network is in a congestion status or the UE is in a congestion and controlled status is received in step 403, the message in this step may include an indication of the congestion status of the target access network element.

Step 405, the target mobility management network element sends a relocation request to the source mobility management network element, wherein the relocation request includes the indication of the congestion status of the target access network element.

Step 406, the source mobility management network element sends a handover command to the target access network element, wherein the handover command includes the congestion status information of the target access network element.

After the source access network element receives the congestion status information of the target access network element, if the target access network element is in a non-congestion status, then the source access network element may include congestion status removing indication in a header of an uplink user plane data packet, and after receiving the congestion status removing indication, the network side may initiate a step of removing the congestion measure.

Figure 5:
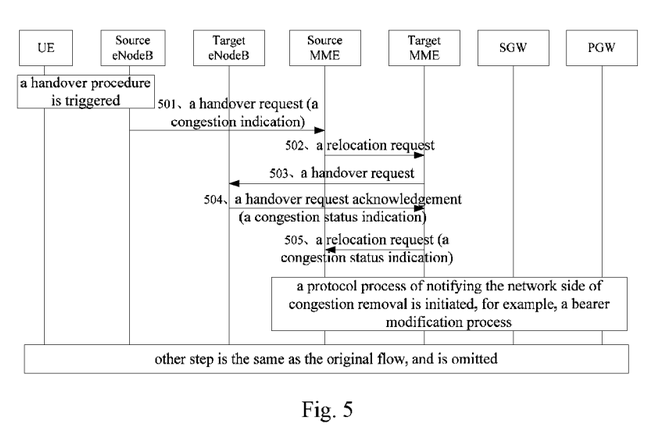
FIG. 5 is an implementation flowchart of a congestion processing method provided by one embodiment of the present invention.

FIG. 5 shows an implementation flow of a congestion processing method provided by one embodiment of the present invention. The difference with the foregoing embodiments described in FIG. 2 and FIG. 3 lies in that, in this embodiment, after UE performs handover to a target access network element, if a source mobility management network element finds out that a network element in a target side is in a non-congestion status, then the source mobility management network element may also notify a core network side to initiate a measure of removing a congestion removal, which is illustrated specifically as follows.

Step 501, a source access network element sends a handover request to the source mobility management network element, wherein the handover request includes indication for indicating that a source side access network is in a congestion status or the UE is in a congestion and controlled status currently.

Step 502, the source mobility management network element sends a relocation request to a target mobility management network element.

Optionally, the message may also include the indication for indicating the source access network is in a congestion status or the UE is in the congestion and controlled status, which is received in step 501.

Step 503, the target mobility management network element sends a handover request to the target access network element.

Optionally, the message may also include the indication for indicating the source access network is in a congestion status or the UE is in the congestion and controlled status, which is received in step 502.

Step 504, the target access network element sends a handover request acknowledgement to the target mobility management network element, wherein the handover request acknowledgement includes a congestion status indication of the currently accessed target access network element, which indicates whether the target access network element is in a congestion status.

Optionally, after the indication for indicating the source access network or the UE is in a congestion controlled status is received in step 502, indication for indicating whether the currently accessed access network element is in the congestion status may also be sent to the target mobility management network element.

Step 505, the target mobility management network element sends a relocation request to the source mobility management network element.

In one embodiment, the relocation request includes the congestion status indication of the current access network element, and the indication indicates the congestion status of the target access network element. If the currently accessed network element is in a non-congestion status, the source mobility management network element may initiate a protocol process of notifying the network side of congestion removal, for example, but not limited to a bearer modification process or the like. When receiving the indication that the UE resides in a non-congested access network, the network side may initiate a measure of removing congestion, for example, a processes of modifying a QoS parameter of a bearer, and the like.

Figure 6:
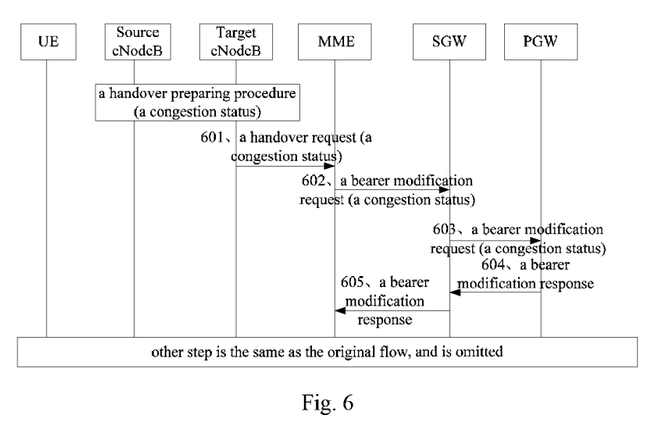
FIG. 6 is an implementation flowchart of a congestion processing method provided by one embodiment of the present invention.

FIG. 6 shows an implementation flow of a congestion processing method provided by one embodiment of the present invention. The difference with a foregoing embodiment lies in that, this embodiment involves processing in a handover procedure in which only an access network element equipment is changed with a mobility management network element unchanged. The handover procedure refers to that there exists a direct interface (e.g., an X2 interface) between a source access network element and a target access network element, then the source access network element and the target access network element may directly transmit information. The foregoing embodiment refers to that there is no direct interface between the source access network element and the target access network element, so information transmitted between the two access network elements needs to be forwarded by a mobility management network element, which is illustrated specifically as follows.

Step 601, in a handover preparing procedure, a source access network element notifies a target access network element that the source access network is in a congestion status or a UE is currently in a congestion and controlled status. The specific form of the notification message is not limited, for example, as illustrated in a foregoing embodiment.

If the target access network element is in a non-congestion status, and the source access network element is in the congestion status or the UE is currently in the congestion and controlled status, the target access network element may notify a network side to remove the congestion and controlled status of the UE through an uplink user plane data packet. The specific notification process is as illustrated in the second embodiment of the present invention, which will not be described in detail herein.

Step 602, the target access network element sends a handover request to the mobility management network element. If the target access network element is not in the congestion status, then the handover request may include congestion removing indication. The specific form of the indication is not limited, for example, a non-congest status.

Step 603, the mobility management network element sends a bearer modification request to a serving gateway SGW, wherein the bearer modification request includes the congestion release indication. The specific form of the indication is not limited.

Step 604, the serving gateway SGW sends a bearer modification request to a packet data network gateway PGW, wherein the bearer modification request includes the congestion removing indication.

After receiving the congestion removing indication, the network side may initiate to remove a measure used for alleviating congestion, for example, modifying a QoS parameter of a bearer of a user, and the like.

Step 605, the packet data network gateway PGW sends a bearer modification response to the serving gateway SGW.

Step 606, the serving gateway sends a bearer modification response to the mobility management network element.

Other steps are omitted as they are identical to a protocol process.

Figure 7:
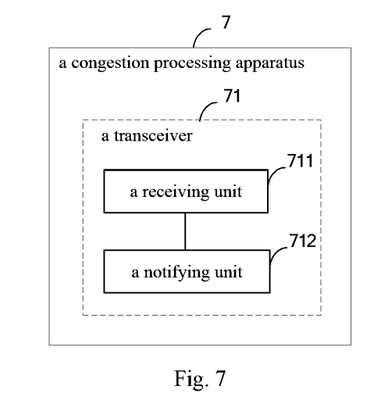
FIG. 7 is a block diagram of a specific structure of a congestion processing apparatus provided by one embodiment of the present invention.

FIG. 7 shows a block diagram of a specific structure of a congestion processing apparatus provided by one embodiment of the present invention. For illustrative purpose, only the parts related to the embodiment of the present invention are shown. In one embodiment, the apparatus 7 is configured to, in a process of a user equipment UE performs handover from a source cell, in a congestion status, of a source access network element to a target cell, in a normal status, of a target access network element, notify a network side to restore a status of the UE from a congestion and controlled status to a normal status. When the apparatus 7 is the source access network element, the target access network element is a second access network element, and the target cell is a second cell. Alternatively, when the apparatus 7 is the target access network element, the source access network element is the second access network element, the source cell is the second cell. The apparatus 7 includes a transceiver 71, and the apparatus 7 may be a target access network element or a source access network element described in an embodiment of a foregoing method.

Specifically, the transceiver 71 includes a receiving unit 711 and a notifying unit 712.

Wherein, the receiving unit 711 is configured to receive second indication information sent by the second access network element, wherein the second indication information is used for indicating a status of the second cell.

The notifying unit 712 is configured to send notification information to the network side according to the indication information, wherein the notification information is used for notifying the network side to restore the status of the UE from the congestion and controlled status to the normal status.

In one embodiment, the first access network element sends the notification information to a packet data network gateway PGW of the network side to notify the PGW to restore the status of the UE from the congestion and controlled status to the normal status.

Wherein, the first access network element may send the notification information in two manners One manner is as follows The first access network element sends the notification information to the packet data network gateway PGW of the network side through an uplink user plane data packet, wherein a header of a GPRS tunneling protocol for the user plane of the uplink user plane data packet comprises the notification information. Specifically, the uplink user plane data packet is an uplink data plane data packet of the UE; or, the uplink user plane data packet is an uplink user plane data packet of other UE, wherein both of the other UE and the UE establish bearers with the same PGW.

The other manner is as follows.

The first access network element firstly sends a first control plane message including the notification information to a mobility management network element of the network side, and the mobility management entity sends a second control plane message including the notification information to the PGW.

Furthermore, the transceiver 71 of the apparatus 7 further includes: a first indication sending unit. The unit is configured to send first indication information to the second access network element. The first indication information is used for indicating a status of a first cell, wherein when the first access network element is the source access network element and the second access network element is the target access network element, the first cell is the source cell; or when the first access network element is the target access network element and the second access network element is the source access network element, the first cell is the target cell.

Furthermore, the notifying unit 712 includes: a notifying module. The module is configured to send the notification information to the packet data network gateway PGW of a network side. The notification information is used for notifying the PGW to restore the status of the UE from the congestion and controlled status to the normal status.

Furthermore, the notifying module includes a message sending sub-module. The sub-module is configured to send a first control plane message including the notification information to the mobility management network element of the network side, and the mobility management network element sends a second control plane message including the notification information to the PGW.

Furthermore, the notifying unit 712 further includes a quality of service restoring module. The module is configured to restore a quality of service QoS of a bearer of a UE from a QoS corresponding to a congestion and controlled status to a QoS corresponding to a normal status. A parameter of a QoS includes a maximum bit rate (Maximum Bit Rate, MBR), an aggregate maximum bit rate (Aggregate Maximum Bit Rate, AMBR) or a guaranteed bit rate (Guaranteed Bit Rate, GBR), and these parameter values are modified to alleviate the congestion and controlled status of the UE.

Furthermore, the receiving unit 711 includes a receiving module. The module is configured to receive second indication information sent by the second access network element through the mobility management network element of the network side.

Those skilled in the art may understand the actions implemented by the units in the apparatus 7, in combination with the actions implemented by the target access network element or the source access network element in an embodiment of a foregoing method.

Figure 8:
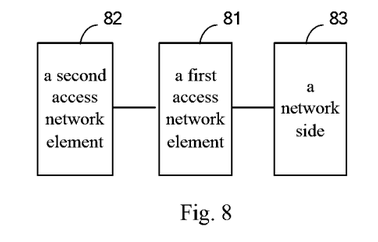
FIG. 8 is a block diagram of a specific structure of a congestion processing system provided by one embodiment of the present invention.

FIG. 8 shows a block diagram of a specific structure of a congestion processing system provided by one embodiment of the present invention. For illustrative purpose, only the parts related to the embodiment of the present invention are shown. Those skilled in the art may understand the actions implemented by the network elements and the interaction of the network elements in the system embodiment, in combination with descriptions in an embodiment of a foregoing method. In one embodiment, the system is applied in a process of a user equipment UE performs handover from a source cell, in a congestion status, of a source access network element to a target cell, in a normal status, of a target access network element, and the system includes: a first access network element 81, a second access network element 82 and a network side 83.

The first access network element 81 receives second indication information sent by the second access network element 82, wherein the second indication information is used for indicating a status of a second cell.

The first access network element 81 sends notification information to the network side 83 according to the indication message, wherein the notification information is used for notifying the network side 83 to restore a status of the UE from a congestion and controlled status to a normal status.

Wherein, the first access network element 81 is the source access network element, the second access network element 82 is the target access network element, and the second cell is the target cell. Alternatively, the first access network element 81 is the target access network element, the second access network element 82 is the source access network element, and the second cell is the source cell.

Specifically, the first access network element 81 and the second access network element 82 include the congestion processing apparatus 7 as shown in FIG. 7. The specific functions of the units in the apparatus 7 may refer to the embodiment described in FIG. 7, which will not be illustrated redundantly herein.

In one embodiment of the present invention, in a process of the user equipment UE performing handover from the source cell, in the congestion status, of the source access network element to the target cell, in the normal status, of the target access network element, the first access network element receives the second indication information sent by the second access network element, and the first access network element sends the notification information to the network side according to the second indication information to notify the network side to restore the status of the UE from the congestion and controlled status to the normal status. Based on the current congestion status of the target cell of the target access network element, that determining how to notify the network side and notifying the network side timely to restore the status of the UE to the normal status are realized, so that better experience can be acquired by a user, a network source can be utilized to a larger extent, and more benefit can be acquired by an operator. It should be noted that, an embodiment in the specification are merely described by taking a UE in a system architecture evolution (System Architecture Evolution, SAE) network as an example. When the UE is in a universal mobile telecommunications system (Universal Mobile Telecommunications System, UMTS) architecture, a manner in an embodiment of the specification is also adopted, which will not be described in detail in the embodiment of the specification.

It is worth noting that, each unit included in the above-mentioned system embodiment is merely divided according to a functional logic, but, as long as a corresponding function can be achieved, it is not limited to the above-mentioned division. In addition, a specific name of a functional unit is merely for convenience to make a distinction between each other, rather than limiting the protection scope of the present invention.

In addition, those of ordinary skill in the art may understand that all or part of steps in an above-mentioned method embodiment may be implemented through a program instructing a relevant hardware. The corresponding program may be stored in a computer readable storage medium, and the storage medium may be an ROM/RAM, a magnetic disk, an optical disk or the like.

The foregoing descriptions are merely preferred embodiments of the present invention, which are not used to limit the present invention. Any modification, equivalent substitution, improvement and the like made within the spirit and principle of the present invention shall fall within the protection scope of the present invention.

What is claimed is:

1. A congestion processing method, comprising:
in a process of a user equipment (UE) performing handover from a source cell, in a congestion status, of a source access network element to a target cell, in a normal status, of a target access network element,
receiving, by a first access network element, second indication information sent by a second access network element, wherein the second indication information indicates a status of a second cell,
sending, by the first access network element, notification information to a core network device according to the second indication information, wherein the notification information is used for notifying the core network device to restore a status of the UE from a congestion and controlled status to a normal status,
wherein the first access network element is the source access network element, the second access network element is the target access network element, and the second cell is the target cell; or the first access network element is the target access network element, the second access network element is the source access network element, and the second cell is the source cell.

2. The method according to claim 1, further comprising:
sending, by the first access network element, first indication information to the second access network element, wherein the first indication information indicates a status of a first cell.

3. The method according to claim 1, wherein the sending the notification information to the core network device comprises:
sending, by the first access network element, the notification information to a packet data network gateway (PGW) of the core network device wherein the notification information is used for notifying the PGW to restore the status of the UE from the congestion and controlled status to the normal status.

4. The method according to claim 3, wherein the sending the notification information to the PGW of the core network device comprises:
sending, by the first access network element, the notification information to the PGW of the core network device through an uplink user plane data packet.

5. The method according to claim 4, wherein a header of a general packet radio service (GPRS) tunneling protocol for the user plane (GTP-U) of the uplink user plane data packet comprises the notification information.

6. The method of claim 4, wherein the uplink user plane data packet is an uplink user plane data packet of the UE; or the uplink user plane data packet is an uplink user plane data packet of second UE, wherein both of the second UE and the UE establish bearers with the same PGW.

7. The method according to claim 3, wherein the sending the notification information to the PGW of the core network device comprises:
sending, by the first access network element, a first control plane message comprising the notification information to a mobility management network element of the core network device;
sending, by the mobility management network element, a second control plane message comprising the notification information to the PGW.

8. The method according to claim 1, wherein restoring the status of the UE from the congestion and controlled status to the normal status comprises:
restoring a quality of service (QoS) of a bearer of the UE from a QoS corresponding to the congestion and controlled status to a QoS corresponding to the normal status.

9. The method according to claim 1, wherein the receiving the second indication information sent by the second access network element comprises:
receiving, by the first access network element, the second indication information sent by the second access network element through a mobility management network element of the core network device.

10. A congestion processing apparatus, applied in a process of a user equipment (UE) performing handover from a source cell, in a congestion status, of a source access network element to a target cell, in a normal status, of a target access network element, wherein when the apparatus is the source access network element, the target access network element is a second access network element, and the target cell is a second cell, or when the apparatus is the target access network element, the source access network element is a second access network element, and the source cell is a second cell, the apparatus comprising:

a transceiver, configured to receive second indication information sent by the second access network element, wherein the second indication information indicates a status of the second cell, wherein the transceiver is further configured to send notification information to a core network device according to the second indication information, wherein the notification information is used for notifying the core network device to restore a status of the UE from a congestion and controlled status to a normal status.

11. The apparatus of claim 10, wherein the transceiver is further configured to send first indication information to the second access network element, wherein the first indication information indicates a status of a first cell.

12. The apparatus of claim 10, wherein the transceiver is further configured to send the notification information to a packet data network gateway (PGW) of the core network device, wherein the notification information is used for notifying the PGW to restore the status of the UE from the congestion and controlled status to the normal status.

13. The apparatus of claim 12, wherein the transceiver sends the notification information to the PGW of the core network device through an uplink user plane data packet.

14. The apparatus of claim 13, wherein a header of a general packet radio service (GPRS) tunneling protocol for the user plane (GTP-U) of the uplink user plane data packet comprises the notification information.

15. The apparatus of claim 13, wherein the uplink user plane data packet is an uplink user plane data packet of the UE; or the uplink user plane data packet is an uplink user plane data packet of second UE, wherein both of the second UE and the UE establish bearers with the same PGW.

16. The apparatus of claim 12, wherein the transceiver is further configured to send a first control plane message comprising the notification information to a mobility management network element of the core network device, and then the mobility management network element sends a second control plane message comprising the notification information to the PGW.

17. The apparatus of claim 10, further comprising:
a processer, configured to restore a quality of service (QoS) of a bearer of the UE from a QoS corresponding to the congestion and controlled status to a QoS corresponding to the normal status.

18. The apparatus of claim 10, wherein the transceiver is further configured to receive the second indication information sent by the second access network element through a mobility management network element of the core network device.

19. A congestion processing system, applied in a process of a user equipment (UE) performing handover from a source cell, in a congestion status, of a source access network element to a target cell, in a normal status, of a target access network element, comprising a first access network element, a second access network element and a core network device, the first access network element receiving second indication information sent by the second access network element, wherein the second indication information indicates a status of a second cell, the first access network element sending notification information to the core network device to the second indication information, wherein the notification information is used for notifying the core network device to restore a status of the UE from a congestion and controlled status to a normal status, wherein the first access network element is the source access network element, the second access network element is the target access network element, and the second cell is the target cell; or the first access network element is the target access network element, the second access network element is the source access network element, and the second cell is the source cell.

* * * * *